United States Patent
Simeon et al.

(10) Patent No.: US 6,252,902 B1
(45) Date of Patent: Jun. 26, 2001

(54) XDSL MODEM HAVING DMT SYMBOL BOUNDARY DETECTION

(75) Inventors: Richard Simeon; James Beaney, both of Raleigh, NC (US)

(73) Assignee: Virata Corporation, Cambridge (GB)

( * ) Notice: Subject to any disclaimer, the term of this patent is extended or adjusted under 35 U.S.C. 154(b) by 0 days.

(21) Appl. No.: 09/394,619

(22) Filed: Sep. 13, 1999

(51) Int. Cl.$^7$ .................................................. H04B 1/38
(52) U.S. Cl. ............................................. 375/222; 375/231
(58) Field of Search .................................... 375/219, 220, 375/222, 235, 261, 245, 234; 370/203, 210, 208; 708/400, 323, 402, 403, 404, 405

(56) References Cited

U.S. PATENT DOCUMENTS

| | | |
|---|---|---|
| 5,285,474 | 2/1994 | Chow et al. . |
| 5,461,640 | 10/1995 | Gatherer . |
| 5,479,447 | 12/1995 | Chow et al. . |
| 5,625,651 | 4/1997 | Cioffi . |
| 5,748,686 | 5/1998 | Langberg et al. . |
| 5,870,432 | 2/1999 | Kerckhove . |
| 5,901,180 | * 5/1999 | Aslanis et al. ..................... 375/261 |
| 5,933,454 | * 8/1999 | Cioffi ................................ 375/260 |
| 5,987,005 | * 11/1999 | Fertner et al. ..................... 370/210 |
| 6,031,868 | * 2/2000 | Robertson et al. ................ 375/222 |
| 6,031,882 | * 2/2000 | Enge et al. ......................... 375/343 |
| 6,035,000 | * 3/2000 | Bingham .......................... 375/296 |
| 6,047,025 | * 4/2000 | Johnson et al. .................. 375/232 |
| 6,130,918 | * 10/2000 | Humphrey et al. ............... 375/295 |
| 6,137,839 | * 10/2000 | Mannering et al. ............... 375/260 |
| 6,137,848 | * 10/2000 | Ho et al. ........................... 375/354 |

OTHER PUBLICATIONS

Thierry Pollet and Miguel Peeters, Alcatel "Synchronization with DMT Modulation" p. 80–86; IEEE Commications Magazine (Apr./1999).

* cited by examiner

*Primary Examiner*—Tesfaldet Bocure
*Assistant Examiner*—Emmanuel Bayard
(74) *Attorney, Agent, or Firm*—Pennie & Edmonds LLP

(57) ABSTRACT

An xDSL communication system using Discrete Multi-tone (DMT) symbols sent over a channel. The magnitude of the channel's frequency-domain equalizing filter is normalized, leaving only phase information. The inverse discrete fourier transform of the normalized filter gives a peak at a position which corresponds to the group time delay of the transmitted DMT symbol. Identification of the symbol boundary facilitates synchronization of the receiver symbol sample phase to the transmitter symbol phase.

27 Claims, 7 Drawing Sheets

XDSL MODEM HAVING DMT SYMBOL BOUNDARY DETECTION

RELATED APPLICATIONS

NONE

TECHNICAL FIELD

The present invention is generally related to the field of digital communications across a transmission line. It is particularly suited to xDSL communications systems in which a time domain filter and/or a frequency domain equalizer is used to compensate for the channel corruption experienced by a transmitted signal.

BACKGROUND OF THE INVENTION

A communication channel linking a first transceiver to a second transceiver carries signals between the two. Regardless of which device transmits and which device receives, the channel typically corrupts a transmitted signal by altering the latter's amplitude and phase characteristics at frequencies across the channel's spectrum. As a result, the receiver receives a noisy version of the transmitted signal. If the nature of the corruption varies with time, the channel is considered to be a time-varying channel. If, on the other hand, the nature of the corruption does not change with time, or changes very slowly relative to the duration of a transmission, the channel is considered to be a time-invariant channel. For time-invariant channels, the corruption experienced by a transmitted signal can be predicted by estimating the channel's impulse response (CIR), which is a representation of the extent of spreading experienced by an impulse transmitted over that channel. One may estimate a time-invariant channel's CIR by transmitting a plurality of known training signals at known times, receiving the channel-corrupted training signals, and then calculating the CIR by techniques such as Least Mean Squares (LMS), among others. Once the CIR of a channel has been calculated, one may develop a channel equalizer to compensate for the corruption experienced by a transmitted signal.

FIG. 1 presents a block diagram of a typical Digital Subscriber Line (xDSL) modem, for HDSL, ADSL, SDSL, VDSL and similar communication. xDSL modems represent the next generation of high-speed digital communications for the Small-Office/Home-Office (SOHO) environment, as well as the burgeoning home user market which has been spurred on by the Internet. As seen in the diagram of FIG. 1, a typical xDSL modem 100 comprises a communication controller 102 to interface with a local network, computer or other equipment, a transceiver 104 and a line driver 106 which interfaces with a twisted-pair transmission line. It should be understood that xDSL modems may have other components and connections as well, and that the blocks shown may not always be present in a single unit.

FIG. 2a shows a block diagram of the modem's transceiver 104. The transceiver 104 includes an analog front end 114, a signal processor 112 and a digital interface 110. The analog front end 114 typically includes a D.C. isolating transformer, filters and amplifiers to connect to the line driver 106, and ADCs and DACs to interface the signal to and from the line driver to the signal processor 112. The digital interface 110 includes circuitry to interface the processed signal output from the signal processor 112 to the communication controller 102.

The signal processor 112 handles a number of functions. These functions may include such things as modulating and demodulating signals, echo cancellation, clipping mitigation, and filtering, among others. Thus, the signal processor 112 is used to convert the transmitted and received digital signals from one form to another. The signal processor 112 is typically implemented through a combination of hardware and executable software code. In the usual case, the signal processor includes a programmable computer, perhaps implemented as a reduced instruction set (RISC) computer, which handles only a handful of specific tasks. The computer is typically provided with at least one computer readable medium, such as a PROM, flash, or other non-volatile memory to store firmware and executable software code, and will usually also have an associated RAM or other volatile memory to provide workspace for data and additional software.

In the typical xDSL communication system, the signals handled by the signal processor 112 are discrete multitone signals (DMTs) comprising N/2 discrete tones simultaneously carried over the twisted pair. The collection of discrete tones is commonly referred to as a symbol, and a sequence of such symbols, spaced apart in time by a sacrificial prefix, are transmitted in xDSL communications. However, signal corruption by the twisted-pair may cause samples comprising one symbol to overlap with samples comprising adjacent symbols despite the presence of the sacrificial prefix. This phenomenon is called inter-symbol interference (ISI). In addition to ISI, another effect of channel corruption is that different DMT tones are attenuated and delayed to different degrees by the twisted pair channel and so may be unwieldy to process later on.

FIG. 2b illustrates some of the functions served by the signal processor 112 when receiving an xDSL signal during normal operation. Once the incoming DMT signal has been sampled by an analog-to-digital converter, the sampled signal is passed through a time domain filter 112a (TDF) to help mitigate ISI. The filtered sampled signal is then buffered in a serial-to-parallel converter 112b where the prefix is stripped and the DMT symbol is formatted and subjected to an N-length DFT, normally implemented as an FFT 112c, to convert the signal into N/2 complex discrete frequency coefficients. The complex signal is then subjected to a frequency domain equalizer 112d (FEQ) which accounts for the uneven attenuation and phase delay of the DMT symbol across the various frequencies. After passing through the FEQ 112d, the individual frequency bins may then be subject to decoding to extract the quadrature amplitude modulation (QAM) encoded signals. A more detailed description of xDSL communication, xDSL transceivers and equalizers can be found in U.S. Pat. Nos. 5,285,474 and 5,479,447, both to Chow et al., whose contents are incorporated by reference to the extent necessary to understand the present invention.

Before normal operations can begin, however, one must first establish the tap coefficients for the TDF 112a and correction factors for the FEQ 112d. The TDF is normally implemented in executable software code and stored as tap coefficients in a memory associated with the signal processor 112. The same holds for the correction factors of the FEQ. Typically, both of these are established at the time a communication link is set up between an xDSL modem and another communications device via a twisted pair. When a communication link for a static channel is first established, the channel distortion characteristics are determined by transmitting known training signals over the twisted pair, receiving the channel-corrupted signals at the receiver, and employing LMS or some other algorithmic technique to estimate the impulse response of the channel. From this training, one may then calculate the taps of the TDF 112a and the correction factors of the FEQ 112d. Ideally, the TDF and FEQ will not only remove ISI, but also account for any attenuation and phase distortion caused by the channel, across all frequencies.

In addition to simply calculating the various tap coefficients and correction factors during training, one must also determine the DMT symbol boundaries. DMT demodulation is predicated on the independence of DMT symbols. The DMT symbols must be independent because the DFT performs circular, rather than linear, convolution. Consequently, receivers must be designed to encapsulate a single and complete DMT symbol for DFT processing. This requires the receivers to be in synchronization with the transmitter's symbol boundary. A more detailed description of synchronization of receivers to transmitters for DMT modulation in xDSL communication can be found in U.S. Pat. No. 5,901,180 to Aslanis et al, and also in T. Pollet et al, "Synchronization With DMT Modulation", IEEE Communications Magazine, April 1999, p. 80–86.

Once created, due to the static nature of the channel's impulse response, the TDF and the FEQ can be used until that particular communication link is terminated. The prior art teaches various techniques to form the time domain filter and a fully-trained frequency domain equalizer. U.S. Pat. Nos. 5,461,640 and 5,870,432, whose contents are incorporated by reference to the extent necessary to understand the present invention, exemplify such prior art techniques.

SUMMARY OF THE INVENTION

The present invention is directed to a method for estimating the boundary of a DMT symbol in an xDSL communication system, which method exploits the phase properties of the fully trained channel equalizer. In the method of the present invention, a length N/2 complex frequency-domain equalizer for a twisted-pair used in an xDSL communication link is first calculated. The amplitude of the N/2 frequency-domain taps are scaled to a common value and to this are appended N/2 additional frequency-domain taps primarily comprising complex conjugates of the N/2 scaled frequency-domain taps, thereby resulting in a vector of length N. The vector of length N is transformed into the time domain comprising real-valued taps. The peak of the resulting real-valued taps is then detected, and the index of this peak tap corresponds to the group time delay due to the channel, and thus reveals the DMT symbol boundary.

The present invention is also directed to an xDSL modem which estimates the boundary of a DMT symbol. The modem exploits the phase properties of the fully trained channel equalizer. The apparatus of the present system includes a signal processor for calculating a frequency-domain equalizer comprising N/2 complex values; divider means for calculating scale factors; multiplier means for scaling each of the N/2 complex values to a common amplitude using the scale factors; conjugating means to form an N length complex frequency-domain vector substantially comprising the N/2 scaled complex values followed by complex conjugates of the N/2 scaled complex values taken in reverse order, inverse discrete fourier transform means to transform the N length complex frequency-domain vector into an N length time domain vector; and peak identification means to determine the index of the largest value in said time domain vector. These means may be a programmable processor, or may be implemented in special purpose hardware.

BRIEF DESCRIPTION OF THE DRAWINGS

The present invention can better be understood through the attached figures in which.

DETAILED DESCRIPTION OF THE INVENTION

Upon establishing a communications link over a channel, the transceiver's receiver begins to train its frequency domain equalizer to compensate for amplitude and phase distortion in the communications channel comprising a twisted pair. Through "force training", the equalizer uses a reference pattern containing the training sequence to force the taps to alter the received signal so that it matches the reference pattern.

Figure 1:
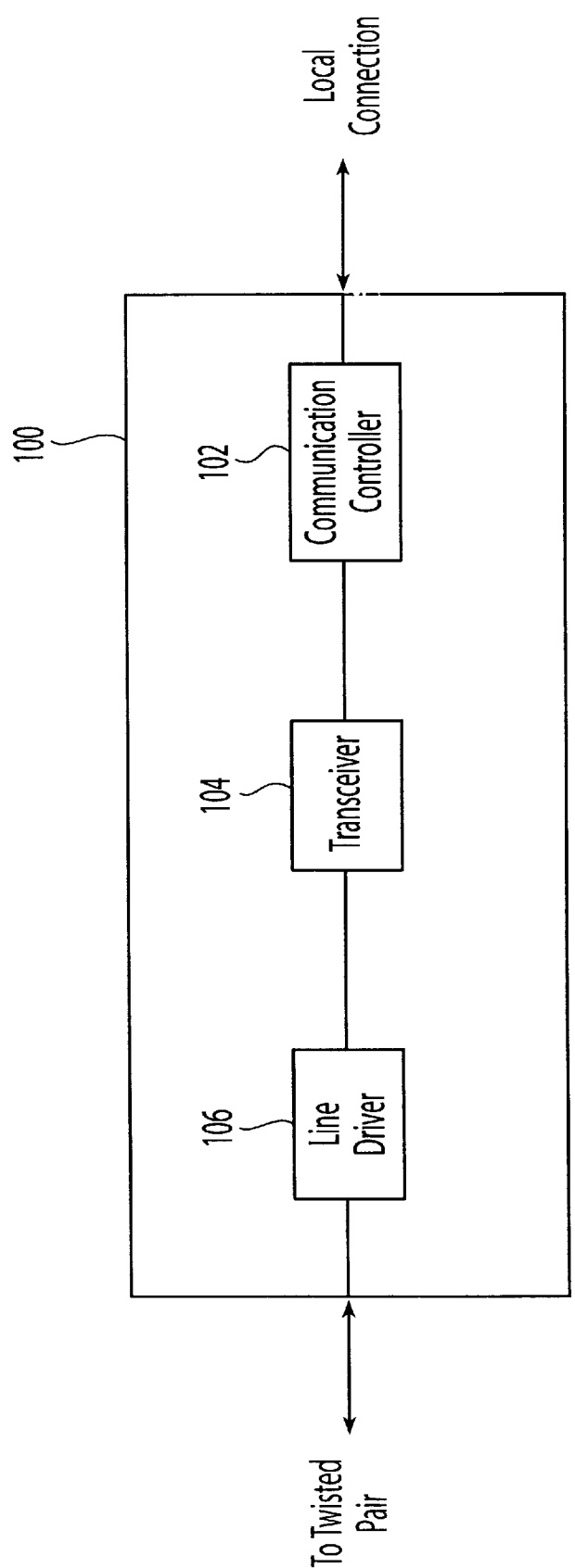
FIG. 1 presents a block diagram of a prior art xDSL modem.
Figure 2A:
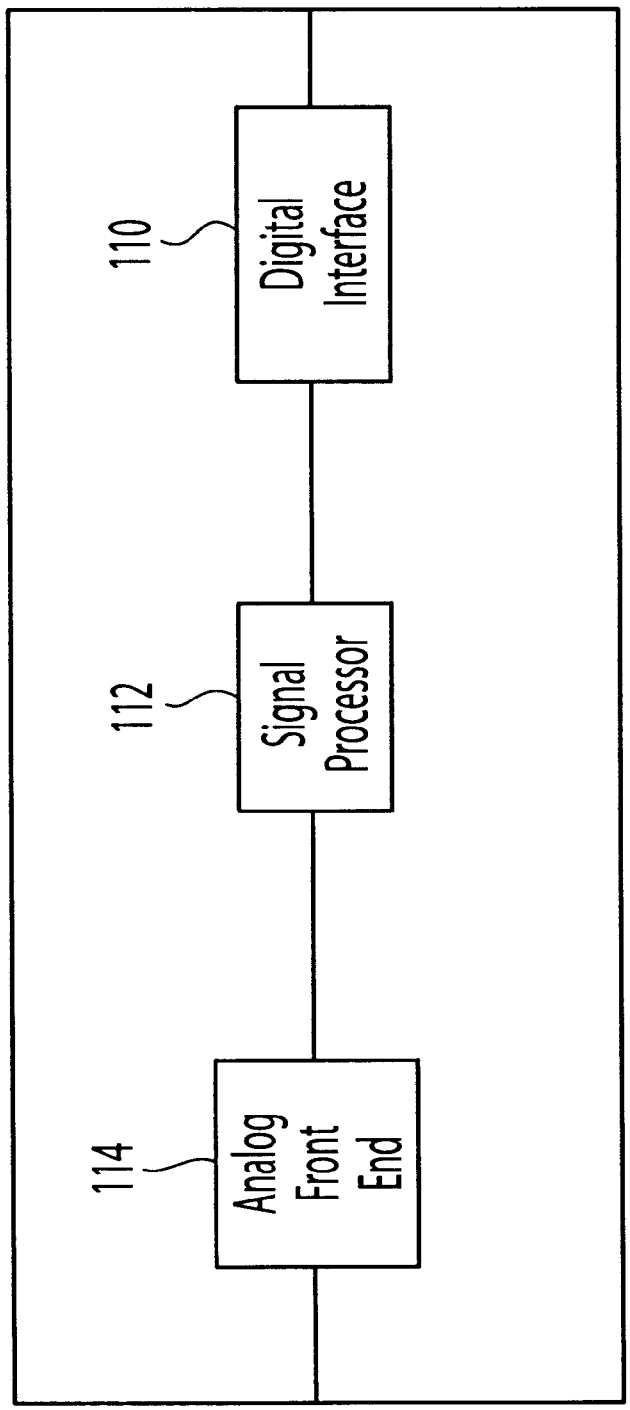
FIGS. 2a & 2b present a structural and a functional block diagram of a typical transceiver in the xDSL modem of FIG. 1.
Figure 2B:
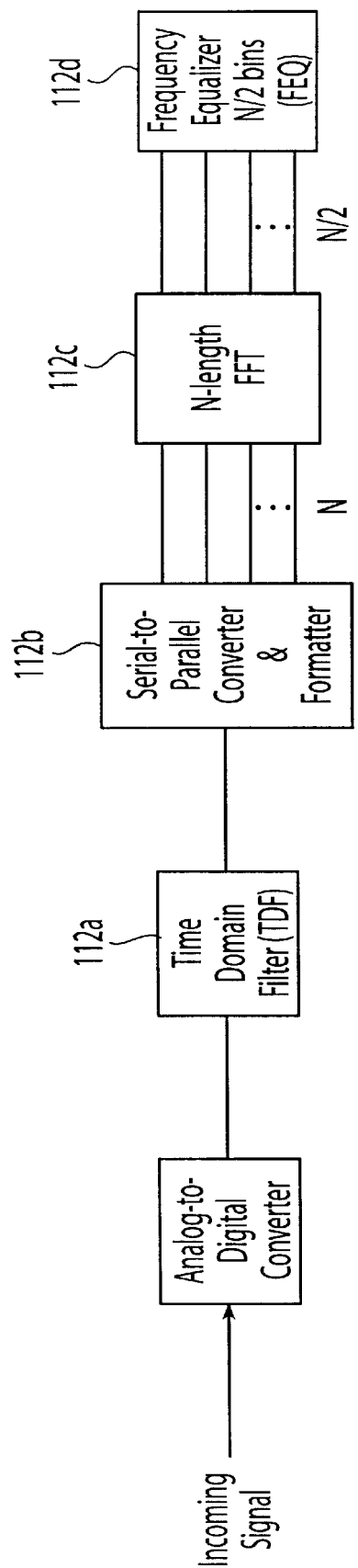
Figure 2C:
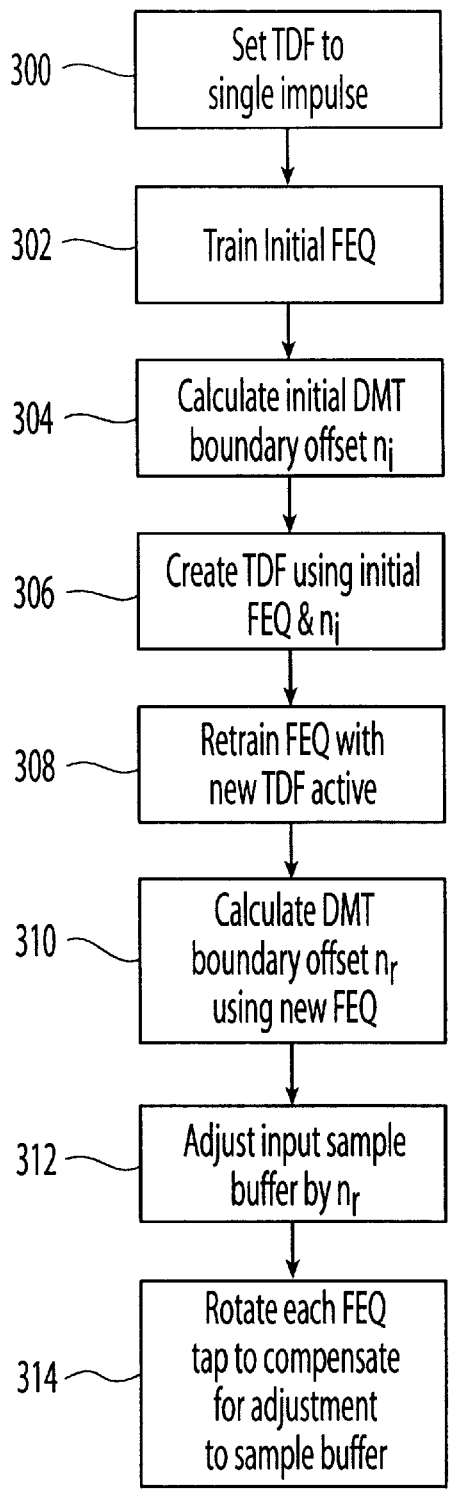
FIG. 2c presents a receiver training sequence in accordance with the present invention.

FIG. 2c illustrates the training sequence used in conjunction with the present invention. In step 300, the first TDF tap is set to 1 and the rest of the TDF vector is set to 0. Therefore, the TDF initially serves as an all-pass filter. In step 302, a first round of training is performed to determine the coefficients of an initial FEQ. This first round of training uses one of several established techniques, such as those disclosed in the above-identified references. At the conclusion of the first round of training, the FEQ is initially trained, but no ISI mitigation has been performed since the TDF is a single impulse and the symbol boundary has not been identified. In step 304, a first round of DMT symbol boundary detection is performed to determine a initial boundary offset $n_i$ based on the initial FEQ. In step 306, the initial FEQ is used to calculate the TDF to help mitigate ISI. Initial boundary offset $n_i$ can be used here to help center the peak of TDF, which now is no longer a single impulse. In step 308, a second round of training is conducted to determine a refined FEQ, again using standard techniques known in the art. For this second round of training, however, the calculated TDF, which is no longer a single impulse, is used to help mitigate ISI. Finally, in step 310, a second round of DMT symbol boundary detection is conducted to find a refined boundary offset $n_r$, which may thereafter be used in DMT symbol boundary determinations. In step 312, the input sample buffer is adjusted by $n_r$ to align the FFT input vector boundary to a symbol boundary. Finally, in step 314, the FEQ taps are rotated (i.e., phase shifted) to compensate for the adjusted sample buffer.

Using the above-described manner, the resulting process compensates for any sample phase offset caused by the receiver's lack of synchronization with the transmitter symbol phase, as well as physical time delays such as system delay and transmission wire delay. When in place, the TDF counteracts ISI, while the FEQ counteracts attenuation and phase distortion due to the channel. In the training sequence of FIG. 2c described above, the taps of the FEQ may be calculated in a number of ways, such as aforementioned U.S. Pat. Nos. 5,461,640 and 5,870,432, and so will not be discussed here in further detail.

In the preferred embodiment, a cyclical sequence of DMT symbols is used to train the xDSL Modem. Once trained, the xDSL modem uses DMT signaling with a total of N1=N/2=128 discrete tones. In such case, the full length FEQ also has 128 complex taps. It should be kept in mind, however, that in the general case, depending on such factors as the channel's total bandwidth and the frequency separation of the tones, N may be some other number and this will consequently affect the number of tap coefficients for a full-length equalizer. Regardless of what technique is used or algorithm is used in its formation, a full-length FEQ, designated by W[k], k=0, 1, 2, ..., N/2−1, is created in step 302 and also in step 308 of FIG. 2c.

Figure 3:
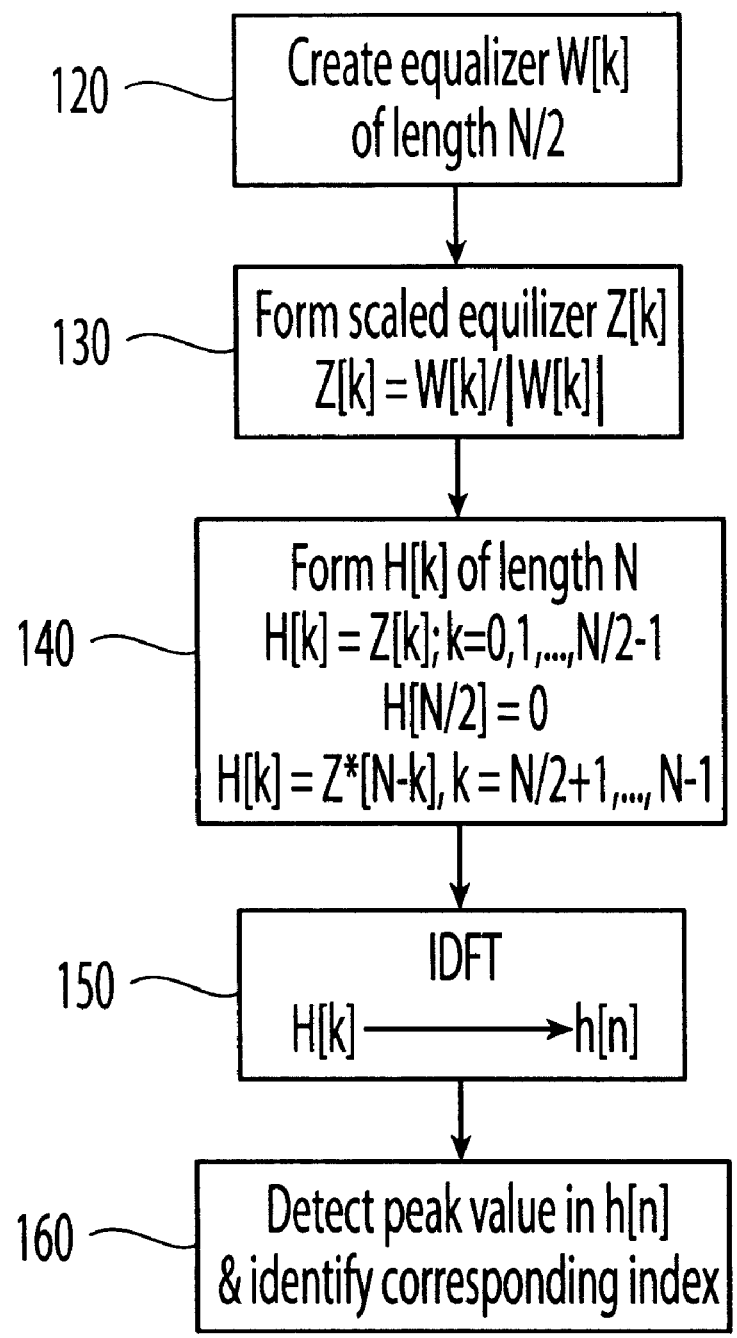
FIG. 3 presents a flow diagram for DMT boundary estimation in accordance with the present invention.

FIG. 3 shows a flow diagram in accordance with the present invention for calculating an offset n0 to determine the DMT symbol boundary in either step 304 or step 310 of FIG. 2c. In step 120 of FIG. 3, the frequency-domain equalizer W[k], k=0, 1, 2, ..., N1−1 is formed, N1 being a positive integer and W[k] comprising complex values comprising a real and an imaginary part. Preferably, N1=N/2, N being an even integer and more preferably, N1=N/2=128, although N1 can be of any length.

In step 130, the amplitude of each of the N/2 complex taps is ignored. This can be done in a number of ways. One way is to scale each complex tap of W[k] to the same amplitude, say 1.0, by creating a normalized vector Z[k] comprising the equalizer's phase information:

$$Z[k]=W[k]/|W[k]|,\ k=0, 1, \ldots, N/2-1$$

Z[k] itself can be formed directly as above, or in a two-step process which first calculates a vector of scale factors:

$$S[k]=1/|W[k]|,\ k=0, 1, \ldots, N/2-1$$

and then multiplies the scale vector by the complex equalizer taps point-by-point to form the normalized vector:

$$Z[k]=S[k]*W[k],\ k=0, 1, \ldots, N/2-1$$

Regardless of how it is formed, Z[k] focuses only on the phase information in the equalizer because it is the phase information that is of interest for boundary detection. This is because it is the phase offset (rather than any amplitude attenuation) between the transmitter and the receiver that alters the phases of the N/2 complex taps. In addition, the channel has substantially linear phase and so the group delay of the samples is representative of the boundary between DMT symbols.

In step 140 complex vector H[k], k=0, 1, 2, ..., N−1 is formed. The first N/2 values of H[k] are the same as the first N/2 values of Z[k]. H[N/2] is zero and the remaining N/2−1 values are the complex conjugates of the last N/2−1 values of Z[k] in reverse order so as to ensure that H[k] has Hermitian symmetry. Thus, $$H[k]=Z[k],\ k=0, 1, 2, \ldots, N/2-1;$$

$$H[k]=0,\ k=N/2;$$

and $$H[k]=Z^*[N-k],\ k=N/2+1 \ldots, N-1$$

In step 150, the inverse discrete fourier transform, preferably implemented via an IFFT, of H[k] is taken resulting in a real time domain vector h[n] of length N. h[n] is real because of the conjugate symmetry of H[k].

In step 160, the index of the peak value of the real coefficients within h[n] is identified. This index corresponds to the group delay of the samples in the equalizer and thus represents the boundary of the DMT symbols as a function of sample position.

The steps shown in FIG. 3 can be carried out entirely by programming the signal processor resident in an xDSL modem, or a processor associated with an xDSL modem. Therefore, the various vectors discussed above are principally just labels for data objects manipulated in software. These data objects may occupy distinct locations in physical memory. Alternatively, one or more of the vectors may share the same physical memory locations—for instance, the original contents of equalizer W[k] may be replaced point by point by their normalized values, and/or normalized vector Z[k] may simply comprise the first N/2 elements of H[k], and other such variations may be possible.

Figure 4:
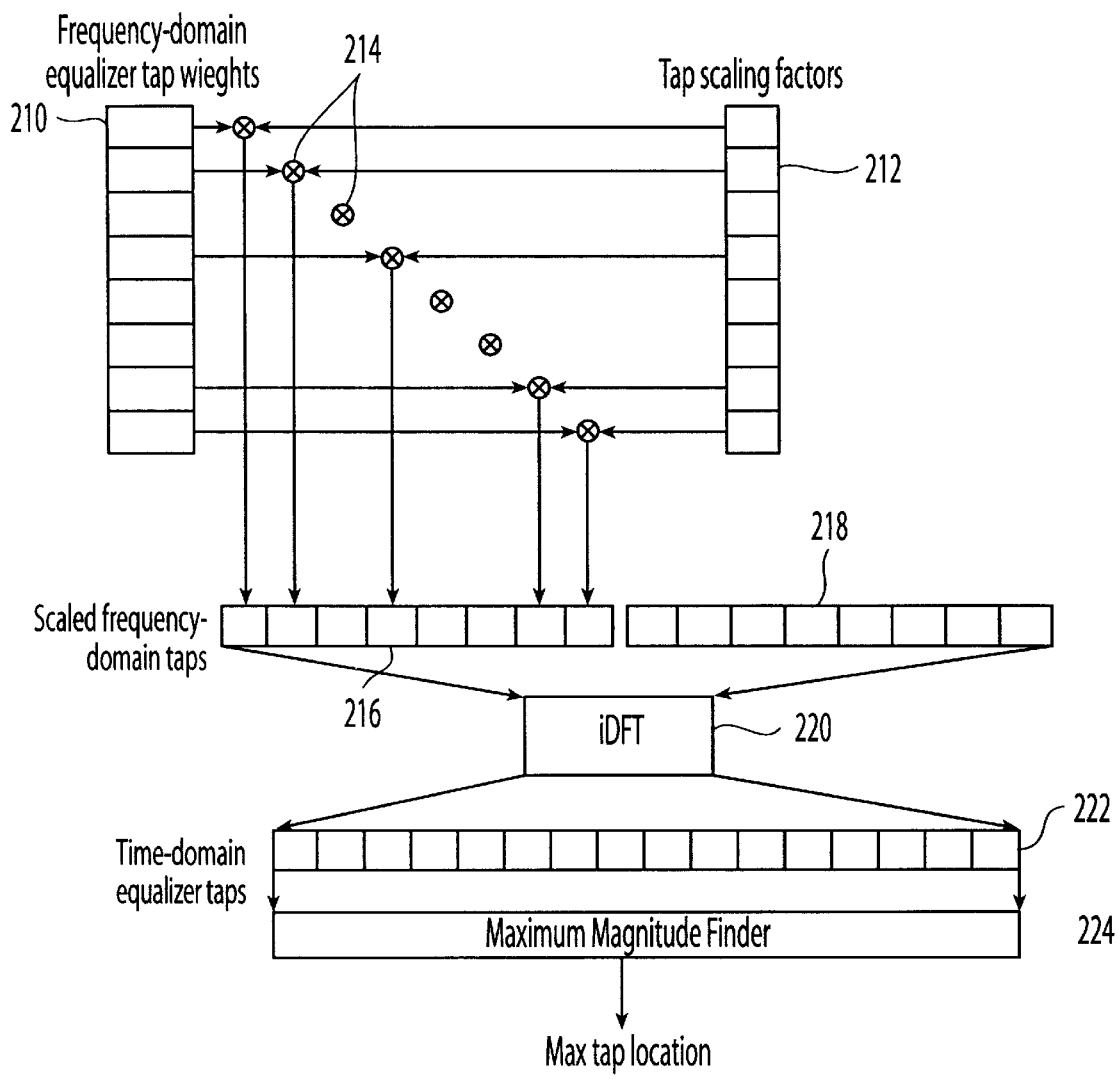
FIG. 4 shows a hardware diagram of an apparatus in accordance with the present invention.

While a software implementation is preferred, it should be noted that the present invention may be implemented in microcode in an xDSL modem, or through special purpose hardware. FIG. 4 shows an idealized hardware implementation 200 in accordance with one embodiment of the present invention. The N/2 frequency-domain weights W[k] are calculated using conventional techniques as discussed above and are stored in first memory 210. The scaling vector S[k] is calculated from the frequency-domain weights by means of a signal processor, a divider perhaps implemented as shift-and-subtract hardware, or the like, to divide the magnitudes of the W[k] or the like, and store the resulting S[k] in a second memory 212. The frequency-domain weights W[k] are multiplied by their corresponding scaling factors of S[k] using a signal processor, or complex multiplier circuitry 214, or the like, and the resulting Z[k], k=0, 1, 2, ..., N/2−1 is stored a third memory 216. The N/2 values in the third memory 216, which represent Z[k] discussed above, can also serve as the first N/2 values of H[k], although this is not an absolute necessity. The remaining values of H[k], i.e., for k=N/2, ... N−1, are stored in a fourth memory 218, which preferably is contiguous to the third memory. The N-length H[k] vector is then transformed by an inverse discrete fourier transformer 220, implemented with a DSP chip, or the like. The result of the transformer 220, h[n], is stored in a fifth memory 222. Fifth memory 222 may be the same as the combined third and fourth memories, in which case h[n] replaces H[k] and H[k] is lost. Alternatively, the fifth memory may be distinct from the combined third and fourth memories 216, 218, respectively, in which case H[k] and h[n] may coexist. Regardless of the memory relationship of H[k] and h[n], a maximum magnitude finder 224, is then used to identify the index $n_0$ of the tap of h[n] having the largest value. This index $n_0$ is representative of the boundary of the DMT symbol.

As discussed above, in the preferred embodiment the multipliers 214, the inverse discrete fourier transformer 220 and the maximum magnitude finder 224, are implemented in software which executes on a signal processor associated with the xDSL modem. Alternatively, these items can be implemented by a computing engine associated with the xDSL modem. In such case, the computing engine may be implemented by a co-processor, a vector processor, a DSP chip, or the like connected to the signal processor. Thus some, or all of these steps may be implemented in special purpose hardware, and the hardware itself may take on different forms such as being implemented on a PC board, perhaps as a host-based or "soft" modem, or as a custom or semi-custom integrated circuit, such as an ASIC or gate array. In the case of a programmable DSP chip or a soft modem which allows a user to modify the executable software code resident therein, one may perhaps download appropriate software from the internet. The downloaded software may be loaded into a flash RAM, or the like, associated with the xDSL modem.

It is also understood that the various memories described above may be a part of a common RAM connected to the computing engine and partitioned by software into a plurality of vectors accessed by software, firmware or directly by hardware. Alternatively, some or all of the various memories may be distinct from one another, comprising special purpose registers or buffers. These memories may be provided as a separate chip, a sub-circuit on a processor chip, or in any one of a number of different ways known to those skilled in the art. It should also be kept in mind that the hardware of FIG. 4 would also necessarily include control circuitry, oscillator signals, power supply lines and other well-known incidental features which are not shown.

In the above discussion, it has been assumed that the arithmetic at each step is performed in floating point. However, this may not be an absolute requirement. Each real and imaginary part of an element of either W[k] or Z[k] comprises a mantissa and an exponent. In the general case, the exponents of both the real and imaginary parts of Z[k], and even of W[k], have a limited dynamic range. This allows one to adjust the finite bit-length mantissas by shifting the mantissa's bits to ensure that the exponents for both the real and imaginary parts for all elements of a vector are the same. If the exponents for both the real and imaginary parts are the same after any such adjustment of the mantissas, the exponents can then be disregarded since only the phase (and not the amplitude) information is important. In the case of W[k], this allows one to use fixed-point divide algorithms, implemented either in hardware, software, or a combination of the two, to calculate Z[k]. In the case of H[k] formed from Z[k], one may then use fixed-point algorithms for calculating the IDFT. Both of these steps save computational load and, in the case of hardware implementations, simplify the circuitry used.

In the above description, it has also been assumed that all N/2 bins of the frequency response of the channel equalizer are used. This, however, is not an absolute requirement. One may instead only use a subset of all available bins, preferably in the middle of the range of all bins of the equalizer, to help determine the DMT symbol boundary. The subset may comprise contiguous bins, or may instead comprise sampled bins—such as every other bin over a predetermined range.

Figure 5A:
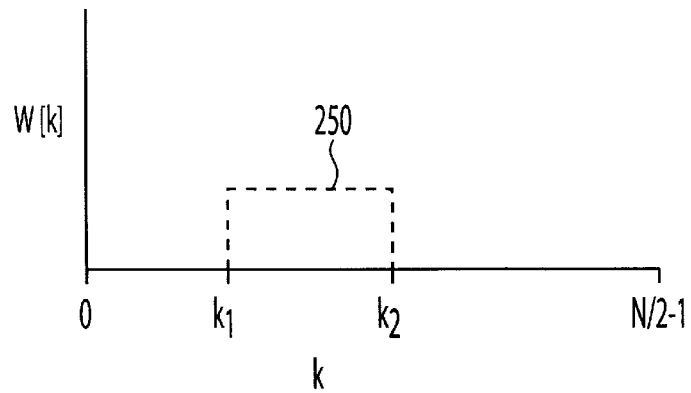
FIGS. 5a–5c illustrate the windowing effect of using a subset of equalizer frequencies.
Figure 5B:
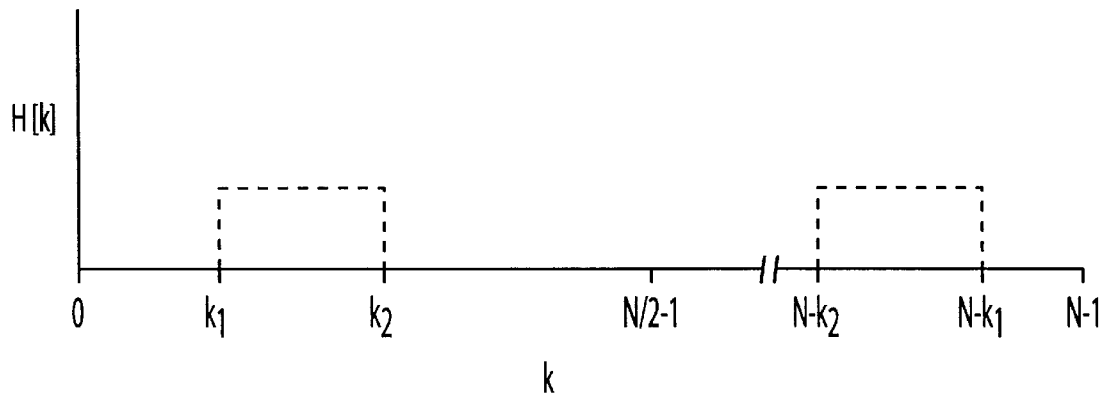
Figure 5C:
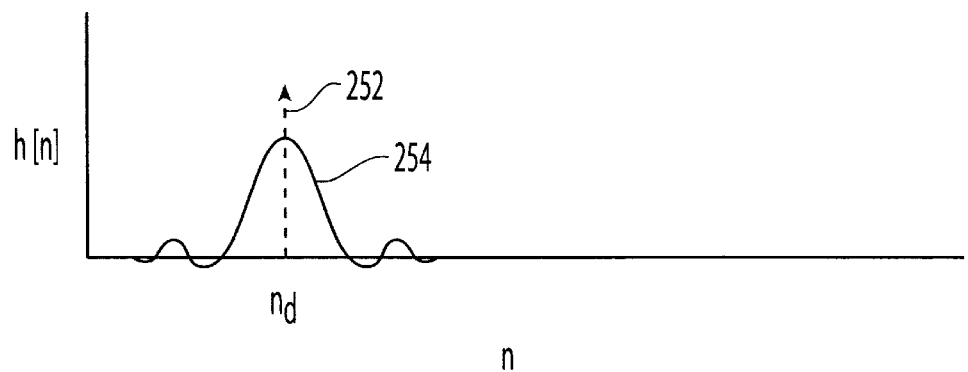

When one uses a subset of contiguous bins, one effectively windows the equalizer in the frequency domain. Thus, any group delay in the time domain h[n] will be convolved with a 'sinc' function, thereby spreading the peak of the group delay over a number of time domain bins, depending on the width of the window, i.e., the number of frequency bins of the equalizer that are used. FIGS. 5a–c illustrate the effect of using only a finite number of frequency bins of the equalizer W[k] to calculate the DMT boundary based on the group delay, assuming that the equalizer has a total of N/2 frequency bins. In FIG. 5a, only the bins between frequency indices k1 and k2 are used. H[k] is then an N-length vector in which only bins k1 to k2 and (N–k2) to (N–k1) are used. In such case, after the inverse discrete fourier transform, h[n] exhibits a peak at some delay index $n_d$. This delay index corresponds to the group delay in the equalizer, and so is reflective of the DMT symbol boundary.

Because only a finite number (i.e., L=k2–k1+1) frequency bins are used, the frequency response of the equalizer a window 250 effectively is applied in the frequency domain. This means that an otherwise perfect impulse 252 in h[n] is convolved with a 'sinc' function 254. However, a pure sinc function would result in h[n] only if the channel has perfectly linear phase over the relevant frequencies. In general, however, even if all frequencies of the equalizer were used, one most likely would not have had a perfect impulse in h[n] due to the distortion characteristics of the channel. Therefore, for actual data, the spread shown in FIG. 5c would most likely be somewhat distorted, for instance by being more spread out and perhaps skewed, rather than being a perfect sinc.

The values of N/2, k1 and k2 may be selected to conform to one or more international communications standards. For example, to comply with the ITU-T G.992.2 standard, for downstream data (i.e., at the customer end), N/2 is 128, k1 is no greater than in 37 and k2 is no less than bin 68. And to comply with this standard for upstream data (i.e., at the central office), N/2 is 32, k1 is no greater than 6 and k2 is no greater than 31. It should be kept in mind, however, that N, k1 and k2 may assume a wide range of values.

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A method of estimating a boundary of a discrete multitone (DMT) symbol in an xDSL communication system, said method comprising:

calculating a frequency-domain equalizer W[k] for said system upon establishment of a communication link, said frequency-domain equalizer comprising a predetermined number N1 of complex coefficients having real and imaginary parts, said complex coefficients representative of amplitude and phase information of said equalizer, wherein N1 is an integer and k is an index of coefficients of W[k];

creating a first complex vector Z[k] having length N1 and comprising complex coefficients having real and imaginary parts, the complex coefficients of Z[k] having substantially the same phase information as W[k];

creating a second complex vector H[k] having length N=2*N1, H[k] substantially comprising the complex coefficients of Z[k] and complex conjugates of Z[k];

inverse discrete fourier transforming H[k] to thereby produce a time-domain vector h[n], n being an integer index of coefficients in h[n]; and identifying a delay index corresponding to a peak value within h[n], said delay index being reflective of a boundary of said DMT symbol.

2. The method of claim 1, comprising using at least one contiguous subset of the coefficients in frequency bins of any one of W[k], Z[k] and H[k] to ultimately calculate h[n].

3. The method of claim 2, wherein N/2=128 and at least frequency bins 37–68 are used to calculate h[n].

4. The method of claim 3, wherein N/2=32 and at least frequency bins 6–31 are used to calculate h[n].

5. The method of claim 1, comprising adjusting mantissas of the real and imaginary parts of W[k] and discarding exponents of said real and imaginary parts of W[k] prior to forming Z[k].

6. The method of claim 1, comprising adjusting mantissas of the real and imaginary parts of Z[k] and discarding exponents of said real and imaginary parts of Z[k] prior to forming H[k].

7. The method of claim 1, comprising adjusting mantissas of the real and imaginary parts of the coefficients of H[k] and discarding exponents of said real and imaginary parts of the coefficients of H[k] prior to inverse discrete fourier transforming H[k] to produce h[n].

8. The method of claim 1, wherein $$Z[k]=W[k]/|W[k]|, k=0, 1, 2, \ldots, N/2-1.$$

9. The method of claim 8, wherein $$H[k]=Z[k], k=0, 1, 2, \ldots, N/2-1;$$

$$H[k]=0, k=N/2;$$

and $$H[k]=Z^*[N-k], k=N/2+1 \ldots, N-1.$$

10. A method of estimating a boundary of a discrete multitone (DMT) symbol sent by a transmitter to a receiver in an xDSL communication system, said method comprising:

establishing a communication link between said transmitter and said receiver over a twisted-pair communication channel;

calculating a frequency-domain equalizer W[k] for said channel, said frequency-domain equalizer comprising a predetermined number N1 complex coefficients having real and imaginary parts, said complex coefficients representative of amplitude and phase information of said equalizer, wherein N1 is an integer and k is an index of coefficients of W[k]; and calculating a group time delay based on information in said frequency-domain equalizer W[k], said group time delay reflective of a boundary of said DMT symbol.

11. The method of claim 10, comprising using at least one contiguous subset of the coefficients in frequency bins of W[k] to calculate the group time delay.

12. The method of claim 11, wherein W[k] has length N1=N/2=128 and at least frequency bins 37–68 are used to calculate the group time delay.

13. The method of claim 11, wherein W[k] has length N1=N/2=32 and at least frequency bins 6–31 are used to calculate the group time delay.

14. The method of claim 10, comprising adjusting mantissas of the real and imaginary parts of W[k] and discarding exponents of said real and imaginary parts of W[k] prior to calculating a group time delay.

15. The method of claim 10, comprising scaling each complex coefficient of W[k] to substantially a same amplitude to thereby form a normalized vector Z[k] prior to calculating the group time delay.

16. The method of claim 15, comprising adjusting mantissas of the real and imaginary parts of Z[k] and discarding exponents of said real and imaginary parts of Z[k] prior to calculating a group time delay.

17. The method of claim 15, wherein $$Z[k]=W[k]/|W[k]|, k=0, 1, 2 \ldots, N/2-1.$$

18. The method of claim 15, comprising creating a complex vector H[k] having length N=2*N1, such that $$H[k]=Z[k], k=0, 1, 2, \ldots, N/2-1;$$

$$H[k]=0, k=N/2;$$

and $$H[k]=Z^*[N-k], k=N/2+1 \ldots, N-1;$$

inverse discrete fourier transforming H[k] to thereby form a time-domain vector h[n]; and identifying a delay index corresponding to a peak value within h[n], said delay index being reflective of a boundary of said DMT symbol.

19. The method of claim 18, comprising adjusting mantissas of the real and imaginary parts of H[k] and discarding exponents of said real and imaginary parts of H[k] prior to inverse discrete fourier transforming H[k].

20. An xDSL modem including a computer readable medium having executable software code stored thereon, the code for estimating a boundary of a discrete multitone (DMT) symbol, the code comprising:

code to calculate a frequency-domain equalizer W[k] for a channel to which said modem is connected, said frequency-domain equalizer comprising a predetermined number N1 complex coefficients having real and imaginary parts, said complex coefficients representative of amplitude and phase information of said equalizer, wherein N1 is an integer and k is an index of coefficients of W[k]; and code to normalize at least a subset of said complex coefficients of W[k] such that each of said complex coefficients has substantially a same amplitude; and code to calculate a group time delay based on normalized complex coefficients of W[k]; said group time delay reflective of a boundary of said DMT symbol.

21. The xDSL modem of claim 20, further comprising code to use at least one contiguous subset of the coefficients of W[k] to calculate the group time delay.

22. The xDSL modem of claim 21, wherein W[k] has length N1=N/2=128 and wherein said code to use at least one contiguous subset uses at least frequency bins 37–68 of W[k] to calculate the group time delay.

23. The xDSL modem of claim 21, wherein W[k] has length N1=N/2=32 and wherein said code to use at least one contiguous subset uses at least frequency bins 6–31 of W[k] to calculate the group time delay.

24. An xDSL modem configured to estimate a boundary of a discrete multitone (DMT) symbol, said xDSL modem comprising:

a first processor configured to calculate coefficients of a frequency-domain equalizer W[k] upon establishment of a communication link between said modem and a remote transceiver over a twisted-pair communication channel when said modem is connected thereto, said frequency-domain equalizer comprising a predetermined number N1 of complex coefficients having real and imaginary parts, said complex coefficients representative of amplitude and phase information of said equalizer, wherein N1 is an integer and k is an index of coefficients of W[k];

a first memory arranged to accommodate a first complex vector Z[k] having length N1 and comprising complex coefficients having real and imaginary parts, the complex coefficients of Z[k] having substantially the same phase information as W[k];

a second memory arranged to accommodate a second complex vector H[k] having length N=2*N1, H[k] comprising the complex coefficients of Z[k] substantially followed by complex conjugates of Z[k];

a second processor arranged to inverse discrete fourier transform H[k] to thereby produce a time-domain vector h[n], n being an integer index of coefficients for h[n]; and a third processor configured to identifying a delay index corresponding to a peak value within h[n], said delay index being reflective of a boundary of said DMT symbol.

25. The xDSL modem of claim 24, wherein said first, second and third processors are one and the same.

26. The xDSL modem of claim 24, wherein said second and third processors are one and the same.

27. The method of claim 10, wherein normalized complex coefficients of W[k] are used to calculate the group time delay.

* * * * *